Aug. 16, 1932. J. GAYAN 1,871,979
BRAKING SYSTEM
Filed April 28, 1931 3 Sheets-Sheet 3
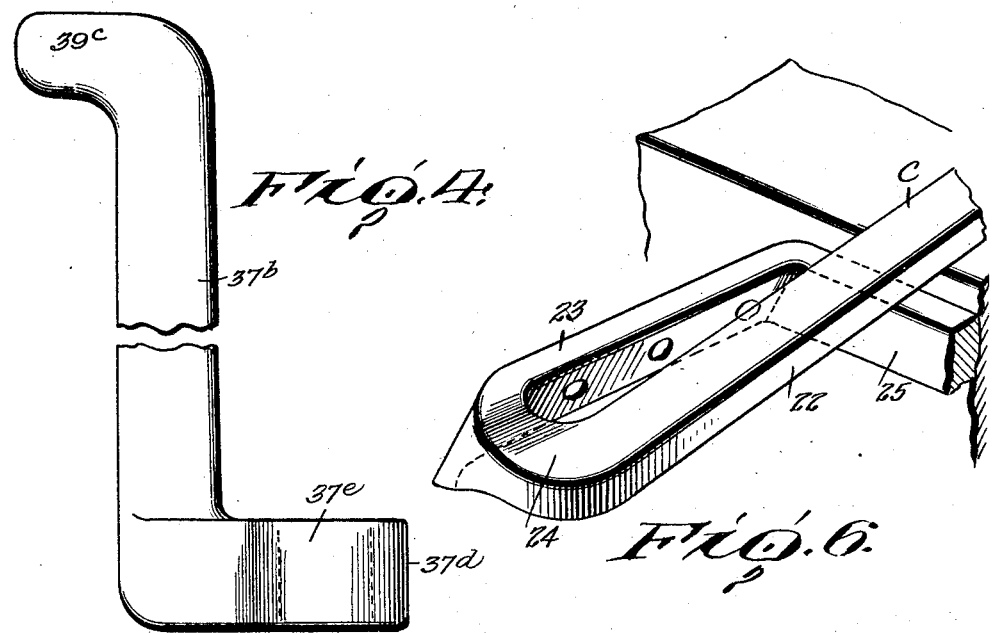
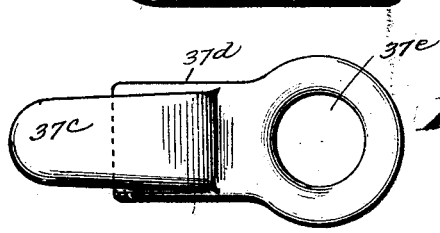
Inventor
John Gayan
By C. J. Stockman
Attorney Patented Aug. 16, 1932

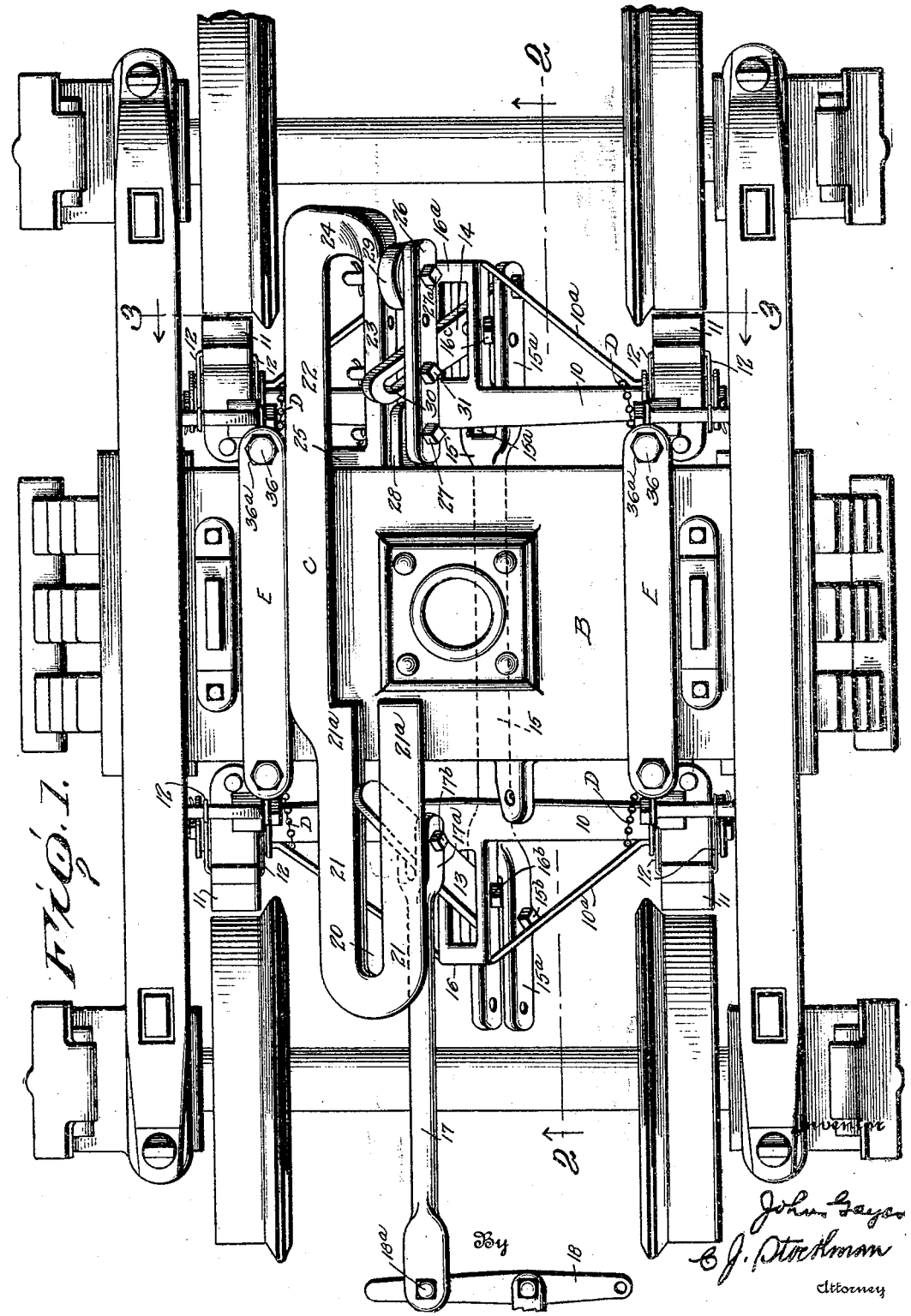

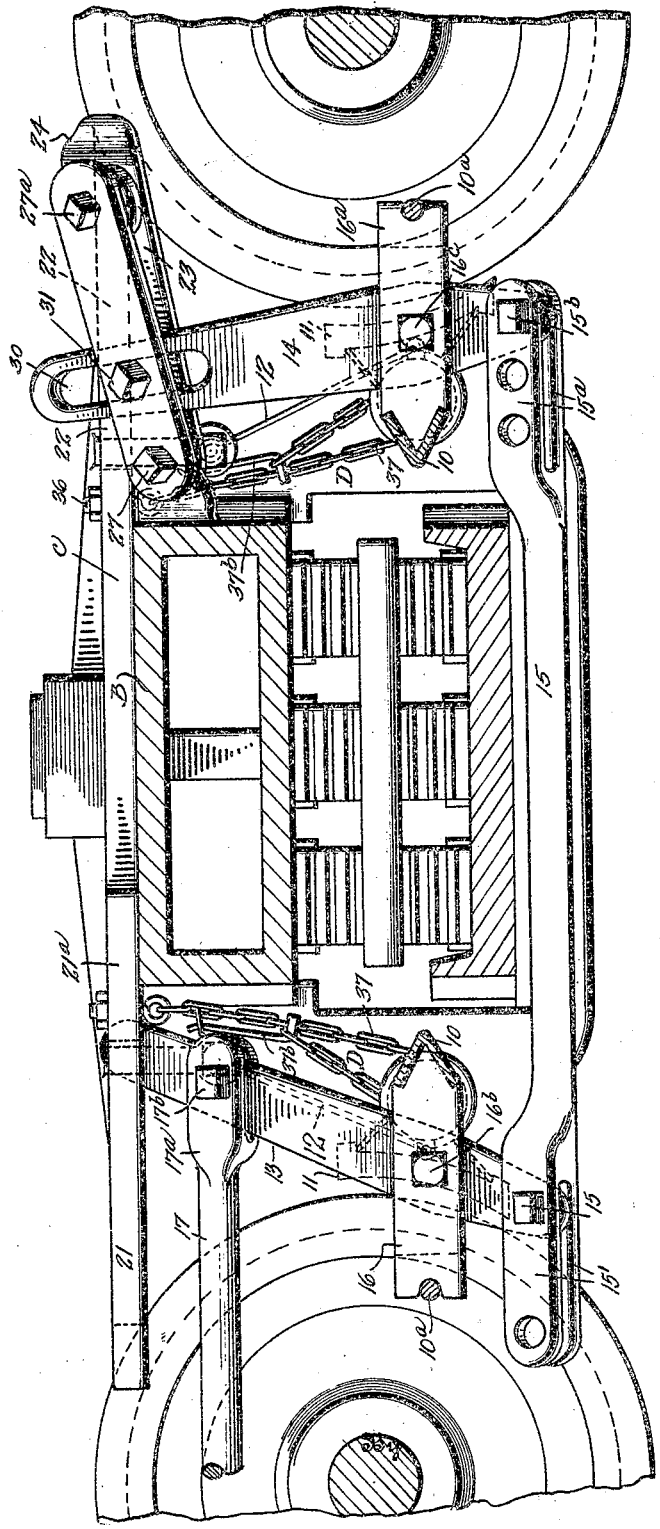

1,871,979

UNITED STATES PATENT OFFICE

JOHN GAYAN, OF BALTIMORE, MARYLAND

BRAKING SYSTEM

Application filed April 28, 1931. Serial No. 533,512.

Bending or breaking of the lever guides forming parts of the braking systems of railway trucks and breaking of the hangers which support the brake beams of said trucks, as heretofore constructed, are of frequent occurence and not only call for repairs, the expense of which is considerable in the aggregate, but also are attended with danger to lives and property. The purpose of this invention is to eliminate the said expense and the said danger to lives and property by means of simple, practicable and effective nature.

This purpose is attained by the construction illustrated in the accompanying drawings, in which:

Fig. 1 is a plan view of a railway truck embodying the instant improvement;

Fig. 2 is a vertical longitudinal section through the same on the line 2—2 of Fig. 1;

Fig. 3 is a transverse vertical section on the line 3—3 of Fig. 1;

Fig. 4 is a view in elevation and on a larger scale than any of the preceding figures of the element employed in the respective chains for readily attaching appropriate chain links with each other to form a sustaining loop for the corresponding part of a brake beam;

Fig. 5 is a plan view of the said element; and

Fig. 6 is a detail representation showing one end of the member which forms an element of the safety guide for the dead lever of the braking system.

Similar reference characters designate corresponding parts in the several views.

Each of the brake beams, which may be of usual or any suitable construction is designated by the reference number 10 and is provided at each of its ends with a shoe 11 also of the usual or any suitable construction. Each brake beam has a reinforcing truss bar 10ª and is supported at its opposite ends by hangers 12, which may be of the usual or any suitable construction adapted to permit the beam to be moved toward and away from the wheels A of the truck in applying and releasing the brakes.

13 designates the live lever at one end of the truck bolster B and 14 designates the dead lever at the other end of said bolster. The lower ends of these two levers are connected with each other by a spreader 15 through which motion applied to the live lever 13 is communicated to the dead lever 14 and said levers are respectively connected, intermediate their ends, to the beams 10 by means operative to cause said beams to be moved into and out of brake applying position when said levers are correspondingly operated.

As here shown, each end of the spreader is bifurcated to provide a pair of longitudinally extending spaced arms 15ª between which the lower ends of the corresponding levers 13, 14 are mounted and held upon a transversely extending pivot bolt. The bolt connecting the lower end of the live lever 13 to one end of the spreader is marked 15ᵇ and the bolt connecting the lower end of the dead lever 14 to the other end of said spreader is marked 15ᶜ.

The connections of the levers 13 and 14, respectively, to the beams are provided by extending the levers through openings formed in projections 16, 16ª which extend from and preferably are integral with said brake beams, and within which openings the levers are mounted on pivot bolts 16ᵇ, 16ᶜ which extend transversely through the levers and are carried by the sides of the respective projections. These projections extend from places midway the lengths of the respective beams.

A brake rod 17 having its rear end bifurcated, as shown at 17ª, to receive a portion of the live lever 13 intermediate the pivot bolt 16ᵇ and the upper extremity of said lever, has its said bifurcated rear end pivoted to the contiguous part of the lever through the medium of a pivot bolt 17ᵇ. The outer end of the brake rod 17 is pivoted at 18ª to one end of a floating lever 18 through which longitudinal motion is transmitted to said brake rod in applying and releasing the brakes.

As shown best in Fig. 1, a bar C arranged on the top surface of the body of the truck bolster B at one side of the center of said bolster and having its respective ends protruding beyond the front and rear sides of the bolster, is provided. The connection between this bar C and said surface of the bolster is of rigid nature and is preferably provided by welding the contiguous surfaces of the bar and bolster together. The end of the bar which protrudes beyond the side of the bolster at which the live lever 13 is arranged provides a substantially horizontal yoke-shaped guide for the upper end of said lever, being formed with a longitudinal slot 20 whose opposite walls have a guiding relationship with the upper end of said lever, the said upper end projecting into and being movable back and forth within said slot. The side arms 21 of the lever guide thus formed have their inner ends engaged for a substantial distance, at 21ª and are rigidly united to, the top surface of the bolster. The other end of the bar, namely, the end which protrudes beyond the side of the bolster at which the dead lever 14 is located, comprises a pair of spaced arms 22, 23 whose outer ends are connected with each other by a cross member 24. The inner end of the arm 23 has a lateral projection 25 which lies against and is rigidly united with the corresponding side of the bolster. This protruding part of the bar C provides a strong and rigid substantially horizontal yoke-shaped member of the guiding means for the dead lever 14, the other member of which guiding means is provided by a bar 26 spaced from the arm 23 and secured to said arm, by fastening bolts, 27, 27ª, respectively. The bolt 27 extends through a spacing washer 29 similarly arranged between the arm 23 and bar 26. The dead lever 14 is made sufficiently long to extend through the space between said arm 23 and bar 26 and is provided with an elongated slot 30 through which a bolt 31 extends, the said bolt also extending through the bar 26 and arm 23, as shown. It will be evident that this means provides a guide for the dead lever which overcomes all liability of accidental bending of the lever or breakage of the guide and hence overcomes one of the fruitful causes of expense and danger to lives and property to which the dead lever guides hereinbefore employed are subject. It will be understood that the dead lever operates within the described guide between the lug 28 and the washer 29 when the corresponding brake beam is being operated in the application and release of the brake and that the bolt 31 and slot 30 cooperate in permitting longitudinal movement of the dead lever in accord with movement of said beam toward and away from said wheels.

Since the members 16, through which the levers 13 and 14 extend, project from the central portions of the respective beams 10, and since the lever guides are arranged at one side of said center, it follows that said levers are laterally inclined to a corresponding extent, as shown in the drawings, and hence the walls of the opening in which the lever 13 operates are correspondingly beveled and the walls of the arm 23 and bar 26 between which the lever 14 operates are correspondingly inclined to be engaged by and to guide said levers. It will thus be seen that all liability of the failure of the brakes to work properly due to bending of the levers or breakage of their guides is overcome.

To avoid the consequences attendant upon breakage of the hangers which support the brake beams, I have provided a means which forms the subject of a separate application for patent filed by me June 16, 1932 as a division of the instant application, the Patent Office having held that it is for an invention separate from that relating to the brake linkage which forms the subject of the claims retained in the instant application. Said means supplements the hangers ordinarily employed and will effectively support the brake means when said hangers fail. This means is here shown as chains D operatively related to the brake beams and adequate to avoid all displacement thereof sufficient to interfere with the setting or releasing of the brakes when any of the corresponding hangers become inoperative. These chains are of special construction now to be set forth, in detail.

In practice, four of these chains D are preferably employed and two of the same are used for opposite ends of the respective beams 10. Each is secured at its upper end to the corresponding end of a bar E, which bar is firmly secured, as by welding, for example, to the upper surface of the bolster B and protrudes at its opposite ends beyond the front and rear sides of said bolster. Eye-bolts 36 having securing nuts 36ª are preferably employed as the means for securing the chains to said bars. Each chain is suspended from the eye of the corresponding eye-bolt and is composed of a number of longitudinal strong links 37, a lateral link 37ª and a connector which comprises a body 37ᵇ whose upper and lower ends are respectively provided with lateral extensions 37ᶜ and 37ᵈ, the latter having an opening 37ᵉ. In each chain assemblage the lateral extension 37ᵈ of the connector forms a foot piece which is engaged by two of the links 37 when the chain has been looped about the corresponding brake beam 10. One of these links is in the downwardly extending side of the chain and extends through the opening 37ᵉ in said foot piece and the other link is in the upwardly extending side of the chain and said foot piece extends therethrough. The latter link, here shown as the one at the end of the chain opposite the eye-bolt, is arranged upon the foot piece at a place inward of the other link, when the chain has been assembled about the corresponding beam, as shown in Fig. 3.

These chains are respectively looped loosely about the corresponding brake beams near the ends of the latter and serve to support the beam in fully operative position in the event that the corresponding hanger or hangers 12 fail to perform their function by reason of breakage or otherwise and at the same time do not interfere with the movement of the brake beams in the setting and releasing of the brakes when the hangers 12 are operating properly. It will be noticed that their construction is such that they may be quickly and easily arranged in operative relationship with the beams merely by looping the chains around the lower sides of the beams and next inserting the selected link 37 of the upwardly extending side of the chain over the projection 37$^c$ and down onto the foot piece 37$^d$ and then inserting the projection 37$^c$ through the link 37$^a$. It will be noticed, in relation to this operation, that the connector is substantially a permanent part of the particular link 37 on the downwardly extending side of the chain which extends through the opening in the footpiece, and that its projection 37$^c$ is disconnectible from the link 37$^a$ and hence it will be apparent that when said projection 37$^c$ is disconnected from said link 37$^a$ the link 37, on the upwardly extending side of the chain, which is or is to be mounted upon the footpiece 37$^d$ may be slipped off or onto said footpiece over the projection 37$^c$.

It will be noticed that these chains may be readily applied to a car truck whether new or old and that the connectors 39, forming elements thereof, provide simple, practicable and strong means capable of withstanding the weight imposed thereon through the links of the chains as well as being conducive to the easy application of the chains in operative relationship with the truck bolster and brake beams. It will also be apparent that they render unnecessary the use of the bars or strikes heretofore provided to catch the brake beams when the hangers break and with reference to which practicable experience has proved their ineffectiveness when needed, since they frequently bend or break under the weight of the beams and permit the latter to fall to the roadway with consequent danger to lives and to the train and road-bed.

It will also be noticed that the yoke-shaped portions which protrude in opposite directions from the top surface of the truck bolster B are arranged in substantially a flatwise position and are connected with each other by the member C, with which they are shown as being integrally formed, and which member is disposed in a flatwise position upon and is rigidly secured to said top surface of the bolster. This construction and correlation of parts assures maximum rigidity and strength essential to avoid all liability of breakage or bending of these elements, by which the levers are guided. The arm 23 of the dead lever 14 is somewhat inclined downward and rearward from the member 24 of said yoke in order that its flange 25 may be of sufficient length to extend underneath the arm 22 and be engaged with the front surface of the truck bolster throughout a considerable length to thereby cooperate with the end of the member C from which the member 22 projects in assuring a strong and rigid connection of this yoke to the top surface and front surface of the said bolster.

Finally, it will be understood that the parts of the truck not herein referred to are, or may be, of the usual or any suitable construction and hence need not be otherwise referred to herein.

Having thus described the invention what I believe to be new and desire to secure by Letters Patent, is:—

1. A braking system for railway car trucks, comprising brake beams, levers pivotally connected between their ends to members projecting from the respective brake beams, means for transmitting movement from one of said levers to the other, and means for guiding the levers including a member which lies upon and is rigidly secured to the top surface of the truck bolster and terminates at one end in a substantially horizontal yoke-shaped portion which protrudes from said top surface and has the inner ends of its side arms rigidly united to said bolster, the said yoke-shaped portion having a guiding relationship with the corresponding lever.

2. A braking system for railway car trucks, comprising brake beams, levers pivotally connected between their ends to members projecting from the respective brake beams, means for transmitting movement from one of said levers to the other, and a guiding means for the levers including a member which lies upon and is rigidly secured to the top surface of the truck bolster and whose opposite ends respectively project beyond the sides of said bolster and have a guiding relationship with the respective levers.

3. A braking system for railway car trucks, comprising brake beams, levers pivotally connected between their ends to members projecting from the respective brake beams, means for transmitting movement from one of said levers to the other, and a guiding means for the levers including a member which lies upon and is rigidly secured to the top surface of the truck bolster and whose opposite ends are substantially yoke-shaped and respectively project outwardly beyond the corresponding sides of the truck bolster and have a guiding relationship with the respective levers.

4. A braking system for railway car trucks, comprising brake beams, levers pivotally connected between their ends to members projecting from the respective brake beams, means for transmitting movement from one of said levers to the other, and means for guiding the levers including a member which lies upon and is rigidly secured to the top surface of the truck bolster and projects at one end outwardly beyond the side of said bolster, a separately formed arm which lies alongside the said projecting end and is rigidly secured thereto in a spaced relation therewith to provide an opening which receives the upper end of the corresponding lever, said projecting end and arm cooperating to provide a guide for said lever.

5. A braking system for railway car trucks, comprising brake beams, levers pivotally connected between their ends to members projecting from the respective brake beams, means for transmitting movement from one of said levers to the other, and means for guiding the levers including a member which lies upon and is rigidly secured to the upper surface of the truck bolster, said member being formed at one end with a yoke-shaped portion which extends outwardly beyond the corresponding side of the truck bolster and whose free end is formed with a flange rigidly secured to the side of the bolster, a separately formed member which lies alongside of one of the arms of said yoke-shaped portion and is rigidly secured thereto in a spaced relation therewith to provide an opening having a guiding relationship with the upper end of the corresponding lever.

6. A braking system for railway car trucks, comprising brake beams, levers pivotally connected between their ends to members projecting from the respective brake beams, means for transmitting movement from one of said levers to the other and means for guiding the levers including a member which lies upon and is rigidly secured to the top surface of the truck bolster and is formed at one end with a substantially horizontal yoke-shaped portion which protrudes from said top surface and provides a pair of spaced longitudinal arms between which the upper end of the corresponding lever operates, the edges of said arms forming the walls of said opening being beveled and being engaged by said lever.

7. A braking system for railway car trucks, comprising brake beams, levers pivotally connected between their ends to members projecting from the respective brake beams, means for transmitting movement from one of said levers to the other and means for guiding the levers including a member which lies upon and is rigidly secured to the top surface of the truck bolster and is formed at one end with a yoke-shaped portion which protrudes from said top surface and has one of its arms arranged horizontally and to its other arm arranged at an inclination downward and rearward from its outer end, the inner end of the latter arm having a flange which spans the space between the arms and lies flatwise against and is rigidly secured to the front surface of the truck bolster and means secured to the said flanged arm and spaced therefrom to provide an opening in which the upper end of the corresponding lever operates.

8. In a braking system for railway car trucks, a brake beam, a dead lever connected between its ends to a member projecting from said brake beam and having its upper end provided with a longitudinal opening, guide means for said lever including a pair of longitudinal members rigidly secured to each other in a spaced relation to provide an opening to receive the upper end of said lever, and means extending across said opening and through the opening in said lever and about which the latter is movable bodily and pivotally.

9. A braking system for railway car trucks, comprising brake beams, levers pivotally connected between their ends to members projecting from the respective brake beams, means for transmitting movement from one of said levers to the other and means for guiding the levers including a member which lies upon and is rigidly secured to the top surface of the truck bolster and is formed at one end with a yoke-shaped portion which protrudes from said top surface and has one of its arms arranged horizontally and to its other arm arranged at an inclination downward and rearward from its outer end, the inner end of the latter arm having a flange which spans the space between the arms and lies flatwise against and is rigidly secured to the front surface of the truck bolster and means secured to the said flanged arm and spaced therefrom to provide an opening in which the upper end of the corresponding lever operates, the part of the lever which operates in the opening between said arms being formed with a longitudinal slot and said arms having a pivot which extends through said slot and relatively to which the lever is movable bodily and pivotally.

JOHN GAYAN.